(12) United States Patent
Namikata

(10) Patent No.: US 7,239,425 B2
(45) Date of Patent: Jul. 3, 2007

(54) COLOR PROCESSING METHOD AND APPARATUS FOR GENERATING A CONVERSION CONDITION FOR CONVERTING DATA IN A DEVICE INDEPENDENT COLOR SPACE INTO DATA IN A DEVICE DEPENDENT COLOR SPACE

(75) Inventor: Takeshi Namikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 707 days.

(21) Appl. No.: 09/946,619

(22) Filed: Sep. 6, 2001

(65) Prior Publication Data

US 2002/0060797 A1    May 23, 2002

(30) Foreign Application Priority Data

Sep. 12, 2000    (JP)    ............................. 2000-276480

(51) Int. Cl.
  *G06K 15/00*    (2006.01)
(52) U.S. Cl. ......................................... 358/2.1; 358/1.9
(58) Field of Classification Search .................. 358/1.8, 358/502, 2.1, 1.9, 500, 501, 515, 517, 518, 358/520, 522
  See application file for complete search history.

(56) References Cited

U.S. PATENT DOCUMENTS

| 5,329,385 | A | | 7/1994 | Washio | ........................ 358/515 |
| 5,887,124 | A | * | 3/1999 | Iwasaki et al. | ............... 358/1.9 |
| 6,108,008 | A | * | 8/2000 | Ohta | ........................... 345/590 |
| 6,304,338 | B1 | | 10/2001 | Sumiuchi et al. | ............ 358/1.9 |
| 6,310,696 | B1 | * | 10/2001 | Kumada | ..................... 358/1.9 |
| 6,313,925 | B1 | * | 11/2001 | Decker et al. | ............... 358/1.9 |

FOREIGN PATENT DOCUMENTS

| JP | 5-153383 | 6/1993 |
| JP | 9-186985 | 7/1997 |
| JP | 9-247471 | 9/1997 |
| JP | 9-326942 | 12/1997 |
| JP | 10-294879 | 11/1998 |

OTHER PUBLICATIONS

U.S. Appl. No 09/420,778, filed Oct. 10, 1999.
U.S. Appl. No. 09/948,605, filed Sep. 10, 2001.

* cited by examiner

*Primary Examiner*—Jerome Grant
(74) *Attorney, Agent, or Firm*—Fitzpatrick, Cella, Harper & Scinto

(57) ABSTRACT

To obtain a conversion condition which enables color reproduction with high precision based on a nonlinear output characteristic of an output device. In order to generate a conversion condition for converting data in a color space independent of a device into data in a color space dependent on a device, a condition for restricting the amount of recording material is set, an output value of a solid on which a color reproducible by an output device in a three-dimensional color space is defined is computed based on the set condition, and the conversion condition is generated based on the colorimetry value of the color reproduced by the output device corresponding to the computed output value.

12 Claims, 16 Drawing Sheets

|   | R | G | B | L | a | b |
|---|---|---|---|---|---|---|
| { | 0 | 0 | 0 | 0 | 0 | 0 |
|   | 0 | 0 | 16 | 12 | −1 | −10 |
|   | ⋮ |   |   | ⋮ |   |   |
|   | 255 | 255 | 255 | 100 | 0 | 0 |

INPUT : R, G, B

⇩

| C=1.0−R, M=1.0−G, Y=1.0−B | 1001 |

⇩

| C=C^γ, M=M^γ, Y=Y^γ, | 1002 |

⇩

INTERPOLATION CALCULATION  1003

⇩

OUTPUT : C, M, Y, K

COLOR PROCESSING METHOD AND APPARATUS FOR GENERATING A CONVERSION CONDITION FOR CONVERTING DATA IN A DEVICE INDEPENDENT COLOR SPACE INTO DATA IN A DEVICE DEPENDENT COLOR SPACE

BACKGROUND OF THE INVENTION

1. Field of the Invention

The present invention relates to a method and an apparatus for processing an image to obtain a conversion condition based on a colorimetry result.

2. Related Background Art

Conventionally, a color masking method of obtaining an output color space by performing a matrix calculation on an input color space, and a method of obtaining an output color space from an input color space using a lookup table (LUT), have been widely used as methods of correcting color to improve a color reproduction effect in a color reproduction process on a printer.

However, since the output characteristic of a color printer includes strong nonlinearity, a global method such as the color masking method, that is, a method in which the entire output color space is affected by a change of a matrix value, has difficulty in adequately approximating the characteristic of a color printer in all color ranges. Also, in the method using the LUT, table values are often determined according to the masking method, so that the same difficulty in color reproducibility is found.

SUMMARY OF THE INVENTION

An object of the present invention is to obtain a conversion condition which enables color reproduction with high precision based on the nonlinear output characteristic of an output device.

Another object of the present invention is appropriately to restrict the amount of recording material.

To achieve these objects, one embodiment of the present invention is an image processing method for generating a conversion condition for converting data in a device independent color space into data in a device dependent color space, in which measurement data, indicated in the device independent color space, of a color patch output by an output device, are inputted, and input color data indicated in the device independent color space is converted into color data indicated by a first plurality of color components, the first plurality of color components consisting of three color components none of which is a black component, on the basis of the measurement data. A condition for restricting an amount of recording material is set, and there is computed color data indicated by a second plurality of color components, the second plurality of color components including plural color components one of which is a black component at each vertex of a solid defining a color reproducible by the output device on a three-dimensional color space, based on the set condition. Then, interpolation is performed to produce color data, indicated by the second plurality of color components, corresponding to the converted input color data, from the computed color data indicated by the second plurality of color components at least one vertex of the solid defining the color reproducible by the output device on the three-dimensional color space.

A further object of the present invention is to effect appropriate control of the generation of black when a conversion condition is obtained based on a colorimetry result.

To achieve these objects, another embodiment of the present invention is an image processing method, in which a color patch is generated by an output device according to first color data indicated by a plurality of color components containing a black component, and measurement data of the color patch, indicated in a device independent color space, is inputted. A relation between the first color data and the measurement data is generated, as is a first conversion condition for converting second color data indicated by three color components not containing a black component into third color data in the device independent color space, based on a second conversion condition for converting the second color data into the first color data and the generated relation. A third conversion condition is obtained for converting the third color data in the device independent color space into the first color data based on the first conversion condition and the second conversion condition.

The above-mentioned and other objects, features and advantages of this invention will become more apparent by reference to the following detailed description of the invention taken in conjunction with the accompanying drawings.

DETAILED DESCRIPTION OF THE PREFERRED EMBODIMENTS

Embodiment 1

The first embodiment of the present invention will be described below by referring to the attached drawings.

Figure 1:
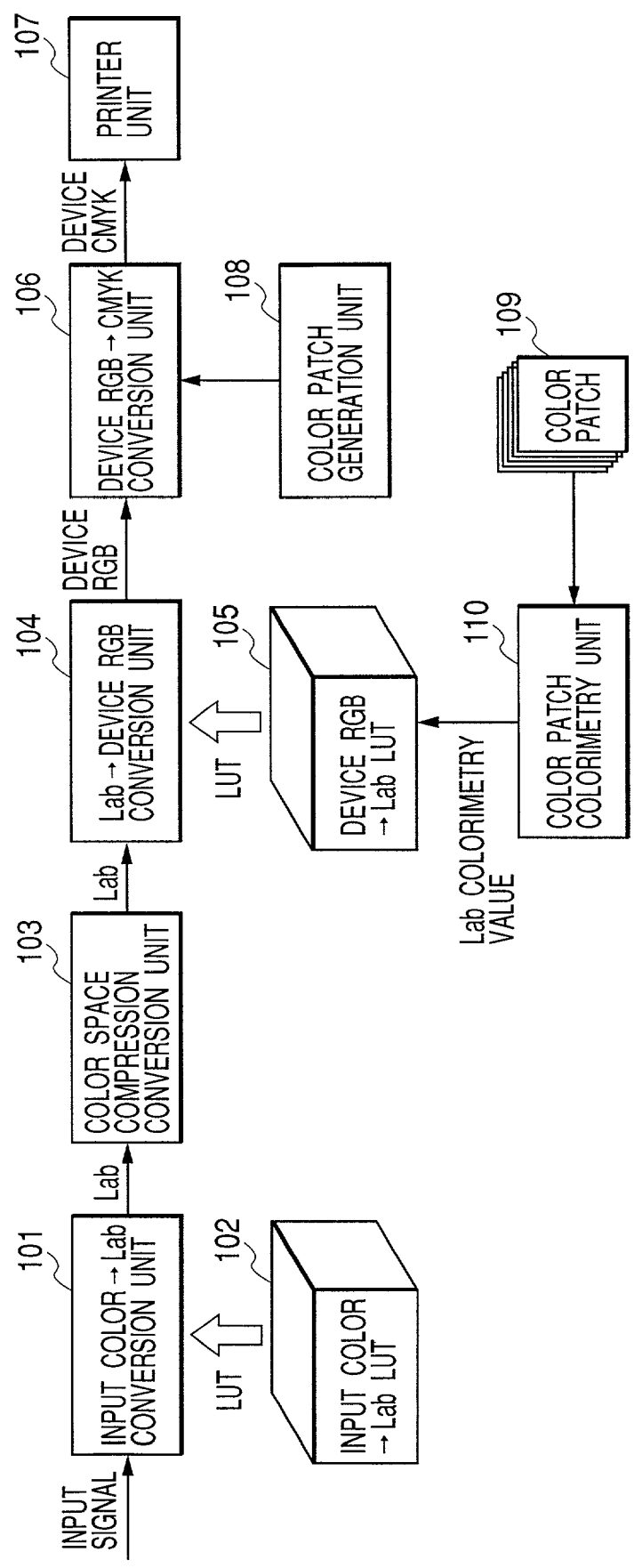
FIG. 1 shows the configuration of the first embodiment of the present invention.

FIG. 1 shows the contents of the process according to the present embodiment. An input signal is a color space signal dependent on a device, and can be, for example, an RGB signal read by a scanner A, a CMYK signal to be output to a printer B. When the structure of this embodiment is applied to a copying machine, the signal can be an RGB signal read by a scanner. When a proof is checked, the signal can be a CMYK signal to be output to a target printer.

Figures 2, 3:
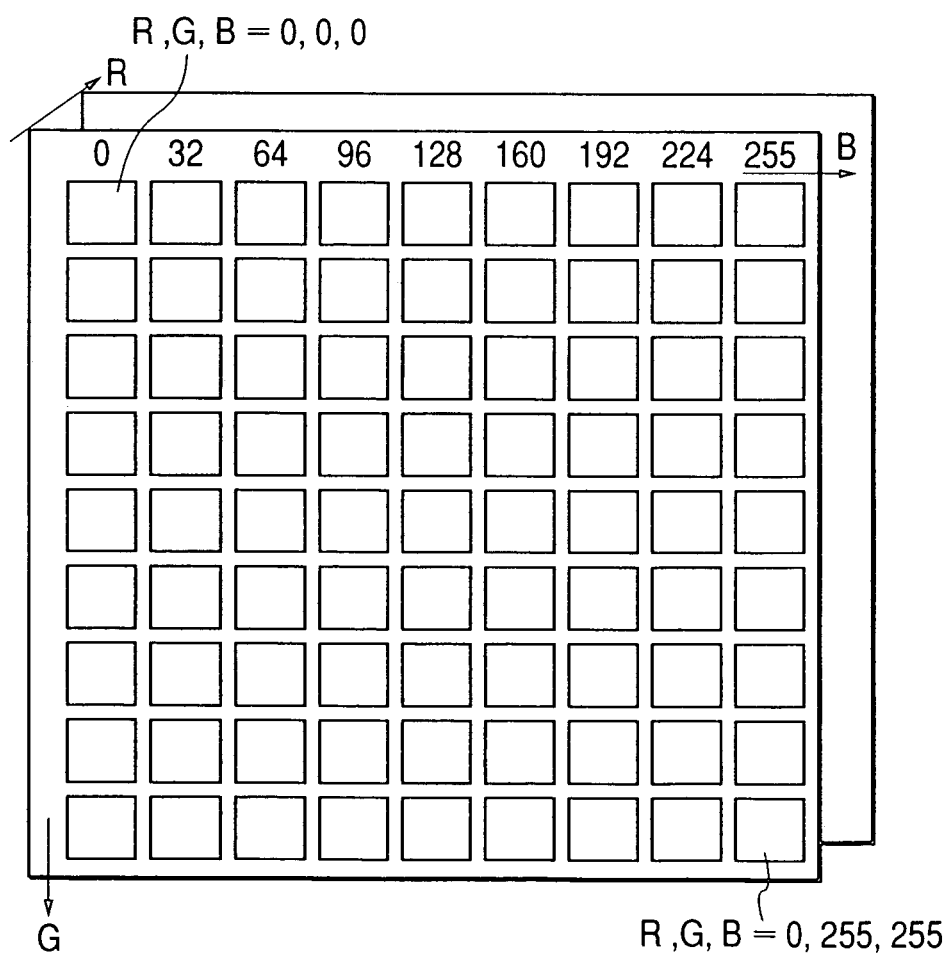
FIG. 2 shows an example of an input color→Lab LUT 102.
FIG. 3 shows an example of a color patch 109.

The above-mentioned input signals are input to an input color→Lab conversion unit 101, and converted into signals in a Lab space which is a color space independent of a device. According to the present embodiment, the conversion is realized by an LUT conversion using the input color→Lab LUT 102. At this time, a table used in the conversion is to be set appropriately in an input color space. For example, when an RGB color space dependent on the scanner A is at the input side, a three-dimensional input/three-dimensional output RGB→Lab conversion table corresponding to an RGB signal value and a Lab value dependent on the scanner A is set as an LUT. Similarly, when a CMYK color space dependent on the printer B is at the input side, a four-dimensional input/three-dimensional output CMYK→Lab conversion table corresponding to a CMYK signal value and a Lab value dependent on the printer B is set as an LUT. FIG. 2 shows an example of an LUT. The example shown in FIG. 2 shows the correspondence between an RGB value having 8 bits for each of the R, G, and B and a Lab value, and only the Lab value is stored as an actual LUT.

In the input color→Lab conversion unit 101, the address on the table is computed from the input signal to retrieve the Lab value from the LUT, interpolation calculation is performed using the retrieved Lab value, and a Lab value corresponding to the input signal is obtained.

The Lab signal obtained by the input color→Lab conversion unit 101 is then input to a Lab→DeviceRGB conversion unit 104, and is converted into a signal in a DeviceRGB space, which is a space dependent on a printer 107, by using DeviceRGB→Lab LUT 105.

When the input color space is an RGB space, the color range is larger than the color reproduction range of the printer in most cases. Therefore, a color space compression conversion unit 103 first performs a mapping process into the actual color reproduction range of the printer, and then inputs the resulting Lab signal into the Lab→DeviceRGB conversion unit 104.

A signal converted by the Lab→DeviceRGB conversion unit 104 for the DeviceRGB space is also converted by the Lab→Device RGB conversion unit 106 for a CMYK color space dependent on the printer 107, and is then transferred to the printer 107. Various well-known methods can be used for the RGB→CMYK conversion, and any of these methods can be arbitrarily used.

According to the present embodiment, the following equations are used for conversion:

$K = \min(1.0\text{-}R, 1.0\text{-}G, 1.0\text{-}B)$ $C = (1.0\text{-}R) - K$ $M = (1.0\text{-}G) - K$ $Y = (1.0\text{-}B) - K$ <Lab→DeviceRGB Conversion Process>

Described below in detail are the Lab→DeviceRGB conversion unit 104 and the DeviceRGB→Lab LUT 105.

In the Lab→DeviceRGB conversion unit 104, a conversion process is performed based on the correspondence between the DeviceRGB signal value stored in a color patch generation unit 108 and the Lab colorimetry value obtained by the color patch colorimetry unit 110.

(Generation of DeviceRGB→Lab LUT 105)

First, the color patch generation unit 108 generates a color patch signal indicating a color patch image as shown in FIG. 3. The color patch signal is transferred to the printer 107 through a process path only passing the Lab→DeviceRGB conversion unit 106, and the printer 107 generates a color patch image 109.

The color patch signal is generated such that the DeviceRGB space can be divided into equal parts. In FIG. 3, an RGB space having 8 bits each for R, G, and B is equally divided into 9×9×9 units, and 729 patches are obtained. In this example, the color space dependent on the printer 107 is a CMYK color space. However, since it is considered that an RGB space can be converted into a CMYK color space according to the conversion rule from the RGB space, the RGB space is considered to be a color space dependent on the printer 107.

Figure 4:
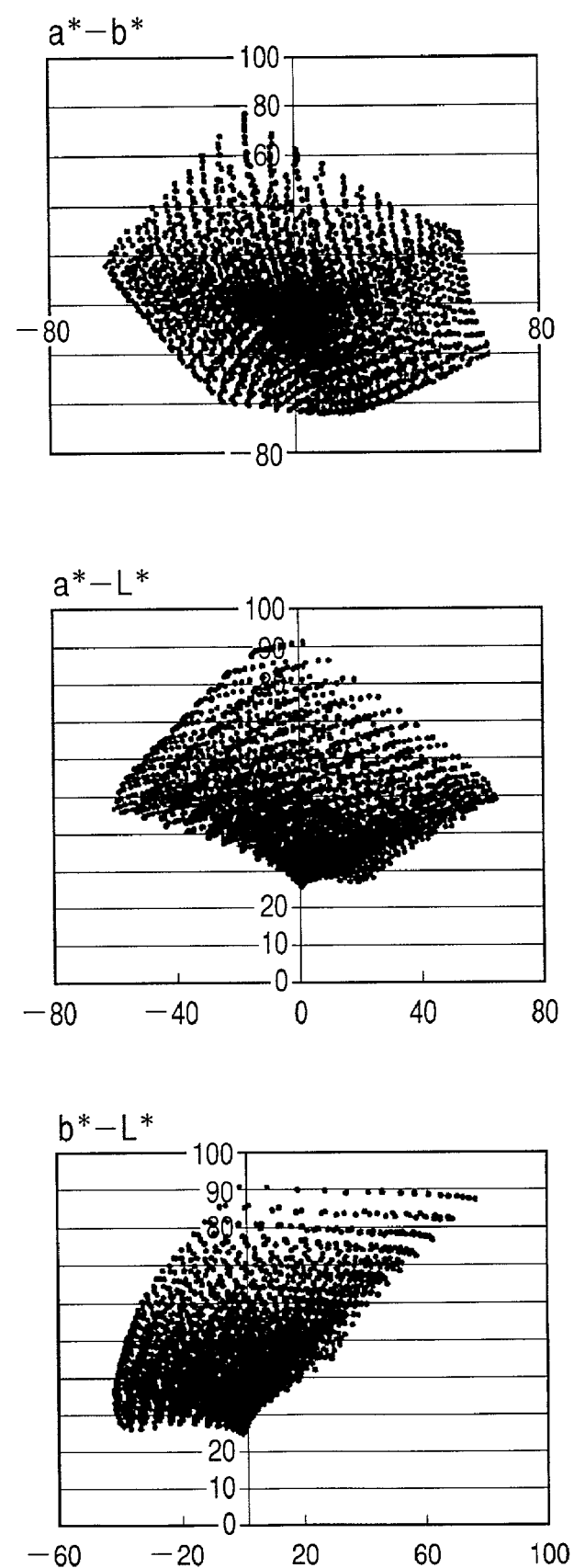
FIG. 4 shows a colorimetry value obtained in a colorimetry process by a color patch colorimetry unit 110 according to the first embodiment of the present invention.

Second, the color patch colorimetry unit 110 performs a colorimetry process on the obtained color patch image 109, and a Lab colorimetry value is obtained for each patch. FIG. 4 shows an example of the obtained Lab colorimetry value.

In the operation, the RGB value generated by the color patch generation unit 108 and the Lab colorimetry value obtained by the color patch colorimetry unit 110 can be obtained. Therefore, a DeviceRGB→Lab LUT for storing the correspondence between the DeviceRGB and the Lab colorimetry value on the points on which the DeviceRGB space is equally divided can be obtained.

(Lab→DeviceRGB Conversion)

A Lab→DeviceRGB conversion is performed using the generated DeviceRGB→Lab LUT, but a problem occurs in the conversion. That is, when an LUT computation is performed, conventional interpolation calculation such as the interpolation on a cube, the interpolation on a tetrahedron, etc., is performed. However, the above-mentioned interpolation calculation can only be performed on a table value when the table input side has a uniform grid. Nevertheless, the DeviceRGB→Lab LUT obtained in the above mentioned process does not have a uniform table value for an input Lab value. Therefore, the interpolation calculation cannot be normally performed using a Lab value as an input value.

Therefore, according to the present embodiment, a Lab→DeviceRGB conversion is performed in the following procedure.

First, the distance (equal to the color difference obtained by a Lab color difference equation) between the Lab value in the DeviceRGB→Lab LUT and the input Lab signal is computed and stored. The obtained distance is expressed by d.

Second, N entries are selected from the DeviceRGB→Lab LUT in order from the shortest distance d for the input Lab value.

At this time, the Lab values are expressed as follows in order from the shortest distance:

DeviceRGB1→Lab1d1

DeviceRGB2→Lab2d2

DeviceRGB3→Lab3d3

. . .

Figure 5:
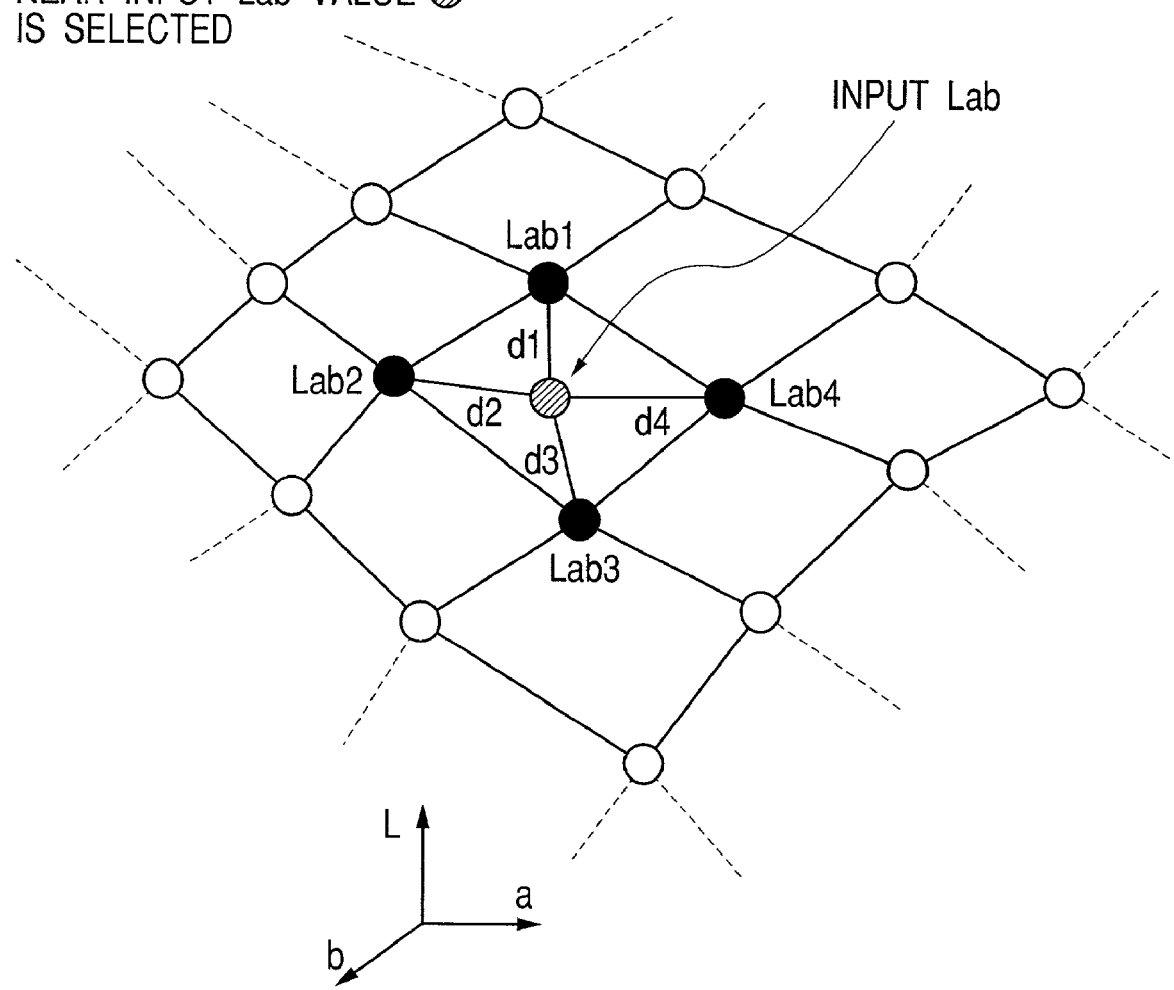
FIG. 5 shows the process of selecting a Lab value (Lab→Device RGB conversion unit 106)

FIG. 5 shows the process of selecting Lab1, Lab2, . . .

Figure 6:
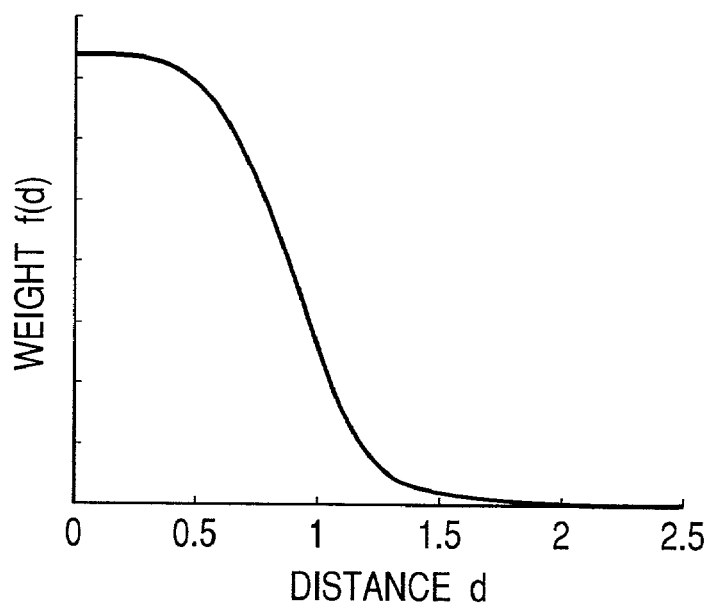
FIG. 6 shows a weight function depending on a distance.

Third, the Device RGB value for an input Lab value is computed as follows:

$RGB = \Sigma RGBi \times f(di)$ $i=N$ $f(x)=1/(1+x^4)$ where f(x) is a function having the curve shown in FIG. 6. That is, the interpolation calculation is performed with a larger weight assigned to an RGB value having a shorter distance in the Lab space.

The number N of the table values in the interpolation calculation can be constant (for example, 8) in the Lab space.

However, in the method of the DeviceRGB→CMYK conversion unit, as shown in FIG. 4, the colorimetry values concentrate on a low brightness L*area. Therefore, a problem can occur when N is a constant. In this area, when N is too small, the distance between the input Lab value and the Lab value of the sample point is too short. Accordingly, the interpolation calculation is performed on a small number of sample points using a large weight. As a result, the problems such as a gradation jump in the DeviceRGB space, a bad white balance in a low brightness range, etc., occur.

Figure 7:
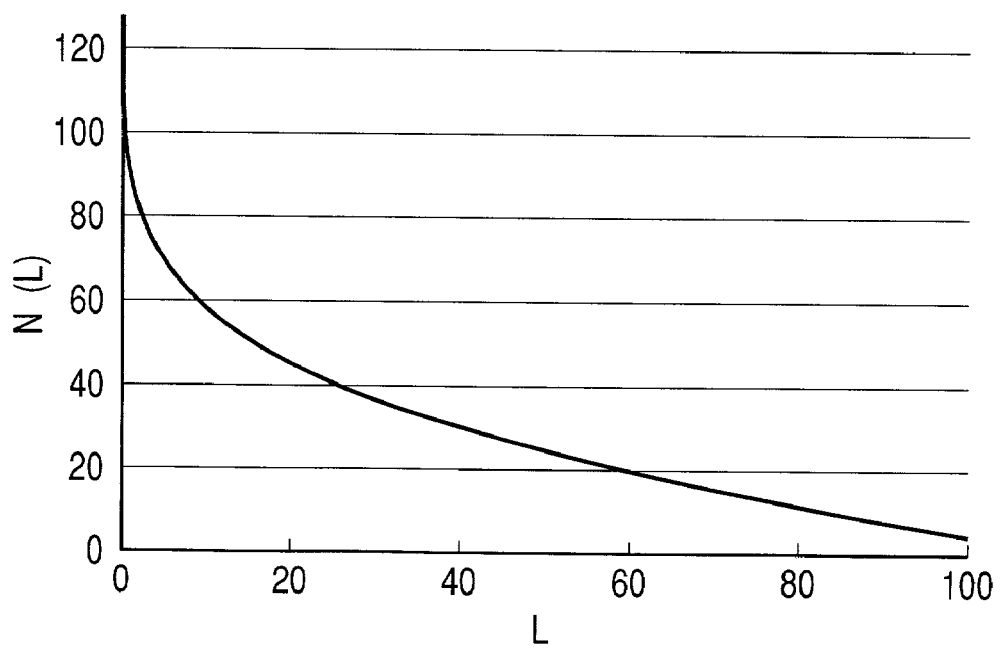
FIG. 7 shows a sample point function.

Therefore, when the interpolation calculation is performed by changing the number of samples depending on the value of the L of the input Lab value as shown in FIG. 7, the effect of solving the above mentioned problems can work. Furthermore, in a high brightness range, the number of samples in the interpolation calculation can be limited, thereby suppressing unclear color. In the function N(L) shown in FIG. 7, the ¼ exponent function is shown as an example with the value of 128 assigned to L=0, and the value of 4 assigned to L=100.

(Color Space Compression)

Described below is the color space compression method used by the color space compression conversion unit 103. There are various methods of color space compression. For example, a color space compression process is performed in a uniform color space as disclosed by Japanese Patent Application Laid-Open No. 8-130655.

Another example is a method of setting a color space compression conversion condition using a Lab colorimetry value obtained by the color patch colorimetry unit 110.

In this color space compression method, a predetermined number (for example, 8) of Lab values are selected from the DeviceRGB→Lab LUT such that the distance d between the input color outside the color reproduction range and the Lab value of the point of the vertical line down onto the color reproduction range from the input color is short, and that the Lab value is positioned on the outside edge of the color reproduction range. The data of the position of the outside edge of the color reproduction range is the data of the position on the 6 planes of a cube forming a DeviceRGB space. That is, the data of the position of the outside edge of the color reproduction range can be detected in advance based on the RGB value generated by the color patch generation unit 108.

As in the above mentioned method of obtaining the DeviceRGB for the input Lab value, the interpolating process is performed using a predetermined number of Lab values weighted by the distance d, and a conversion Lab value in the color reproduction range corresponding to the input color outside the color reproduction range is obtained.

In this color space compression method, an input color outside the color reproduction range can be converted into a color near the outside edge of the color reproduction range having a Lab value of a color close to an input color. That is, a color outside the color reproduction range can be successfully converted into a clear color.

Embodiment 2

Figure 8:
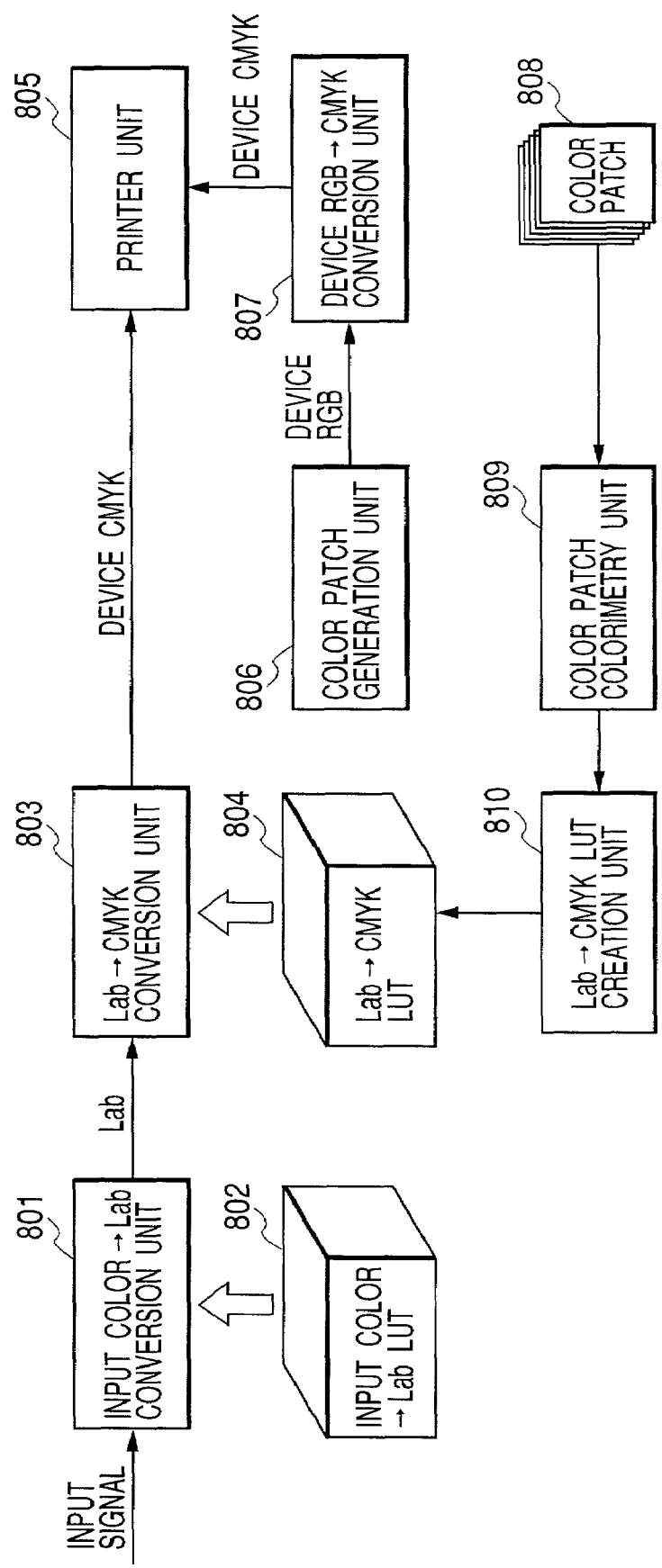
FIG. 8 shows the configuration according to the second embodiment of the present invention.

FIG. 8 shows the configuration of the second embodiment, that is, a modification of the first embodiment, of the present invention. According to the present embodiment, unlike the first embodiment, the conversion from a device independent color space to a printer-dependent color space is performed in the LUT process as in the conversion from an input color to a device independent color space.

After an input color→Lab conversion unit 801 and an input color→Lab LUT 802 perform the same processes as the input color→Lab conversion unit 101 and the input color→Lab LUT 102 according to the first embodiment, a Lab→CMYK conversion unit 803 performs an LUT conversion using a Lab→CMYK LUT 804. The CMYK signal processed in the Lab→CMYK conversion is transmitted to a printer 805 and output. The Lab→CMYK LUT 804 is created as follows. A DeviceRGB color patch image is converted into a DeviceCMYK by a DeviceRGB→CMYK conversion unit 807, and is output on the printer 807. An output color patch 808 is processed by a color patch colorimetry unit 809, and an LUT is created by a Lab→CMYK LUT creation unit 810 based on the obtained colorimetry value and the RGB value generated by the color patch generation unit 806.

The process of the Lab→CMYK LUT creation unit 810 can be performed by performing the color space compression process according to the first embodiment, the Lab→DeviceRGB conversion process, and the DeviceRGB→CMYK conversion on the grid value of the Lab input into the LUT.

For example, if the Lab value is processed as an 8-bit signal, then the grid of the Lab is configured with the value of L ranging from 0 to 255, and with the value of a, b ranging from −128 to 127 in 16 units. When the above mentioned processes are performed on each grid value, a Lab→CMYK LUT can be created.

With the above mentioned configuration, the conversion performed in the first embodiment from the Lab color space to the CMYK color space can be performed using the LUT, thereby efficiently performing the computation.

Embodiment 3

According to the present embodiment, the configuration used in the case in which an sRGB color space which has become a standard color space is used as an input color space is described. The correspondence between the sRGB color space and the XYZ color space is defined, and the sRGB color space can be considered a device independent color space. Therefore, if the sRGB color value is converted into an XYZ value and a Lab value, and the conversion is performed from the Lab value to the printer color space as described above, the signal in the sRGB color space can be reproduced on a printer.

Figure 9:
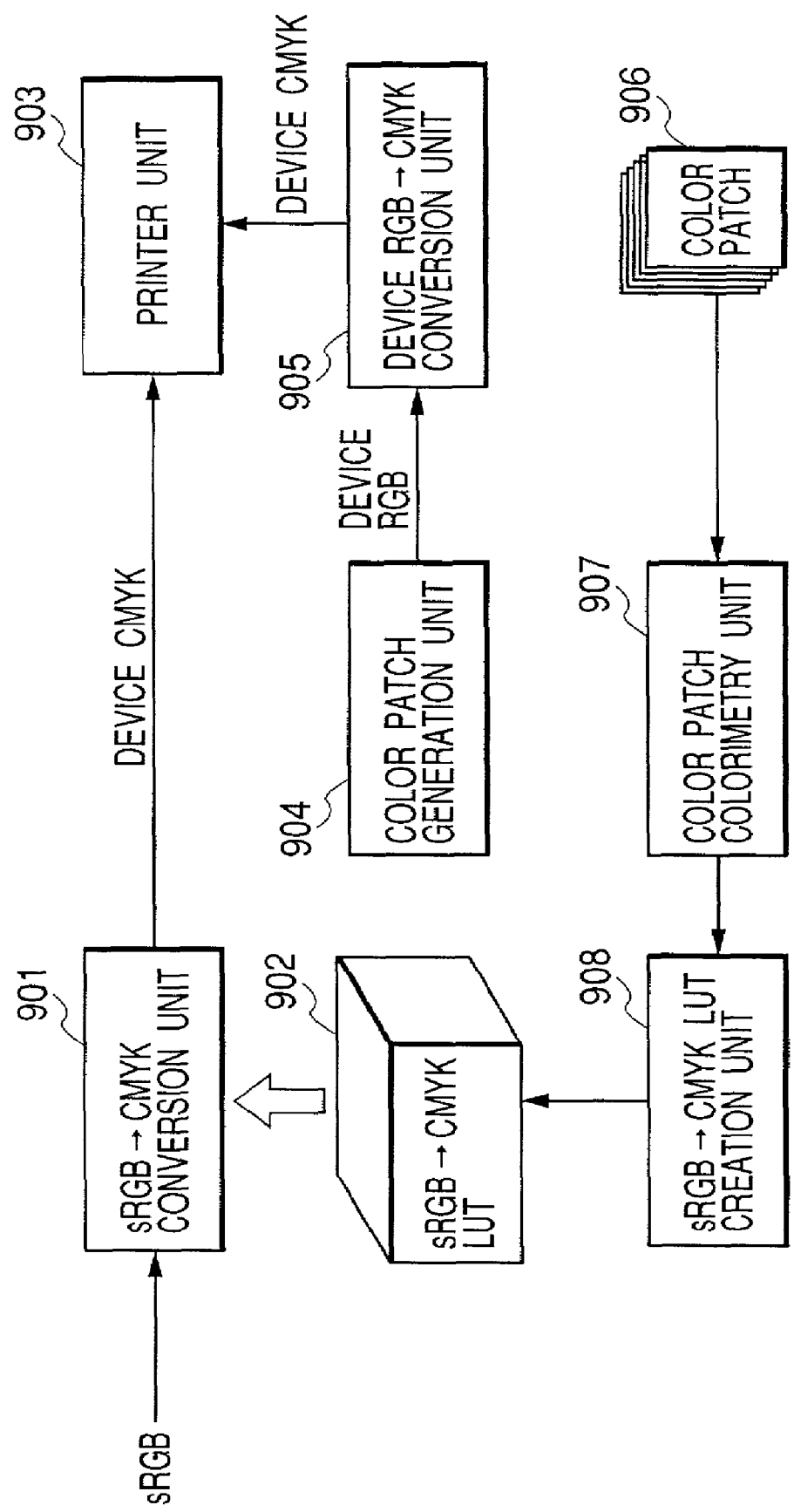
FIG. 9 shows the configuration according to the third embodiment of the present invention.

FIG. 9 shows the configuration according to the present embodiment. The input sRGB signal is converted into a CMYK value in the LUT conversion process using an sRGB→CMYK LUT 902 by an sRGB→CMYK conversion unit 901, transmitted to a printer 903, and output. The sRGB→CMYK LUT 902 is created by a sRGB→CMYK generation unit 908 based on the colorimetry value obtained by performing the colorimetry process on a color patch 906 by a color patch colorimetry unit 907 and the RGB value generated by a color patch generation unit 904.

An sRGB→CMYK LUT is created as follows. Assume that an input sRGB signal is processed as an 8-bit signal, and sRGB grids are configured as 17×17×17 grids. After performing operations of converting sRGB→XYZ and XYZ→Lab by a definition equation, the above mentioned Lab→DeviceRGB conversion process and DeviceRGB→CMYK conversion process are performed on each grid value, thereby obtaining an sRGB→CMYK LUT.

Embodiment 4

Described below according to the present embodiment is an example of replacing the DeviceRGB→CMYK conversion unit described in the first embodiment with another conversion method. Other processes are the same as those in the first embodiment.

Figure 10:
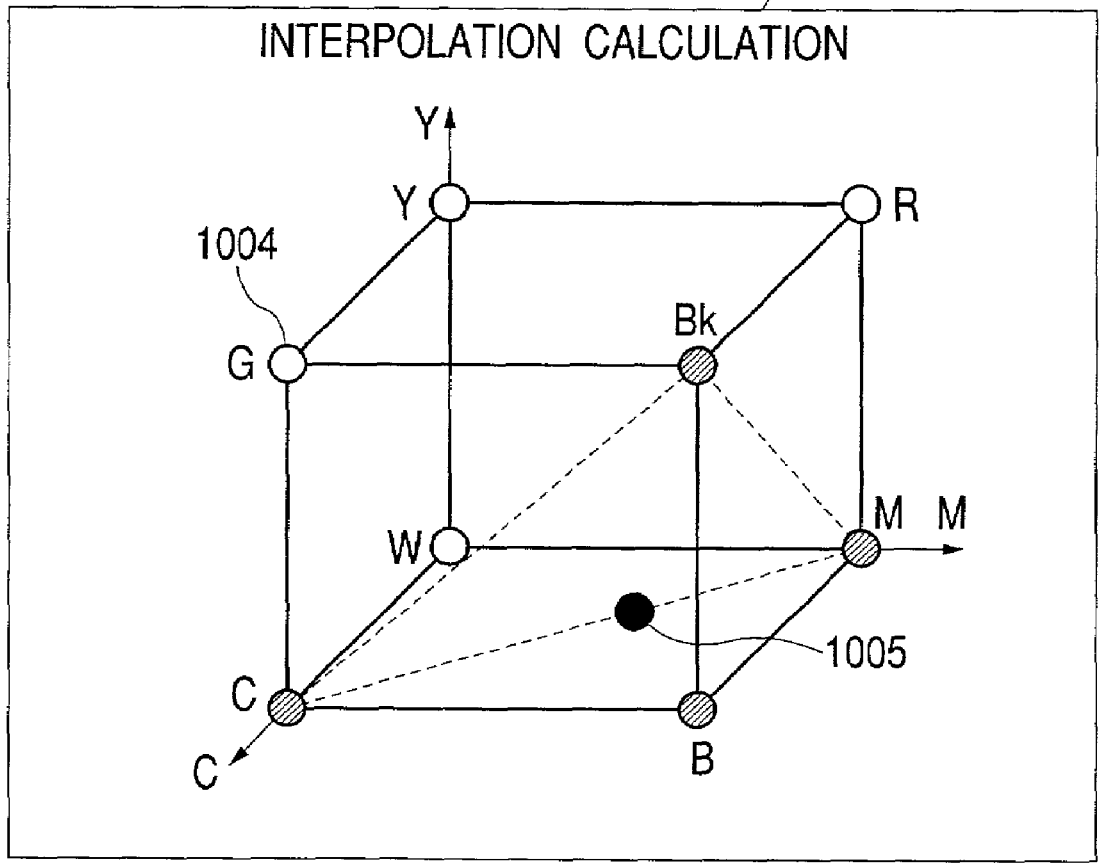
FIG. 10 shows a flow of the process of a Device RGB→CMYK conversion according to the fourth embodiment of the present invention.

FIG. 10 shows the flow of the process of DeviceRGB→CMYK conversion used in the present embodiment. After input and normalized into [0:1], the Device RGB value is inverted in 1001, and converted into a CMY signal. Then, in 1002, a gamma conversion is performed using a parameter γ as follows:

$C = C^\gamma$ $M = M^\gamma$ $Y = Y^\gamma$

The gamma-converted CMY signal is further converted into an CMYK signal in the interpolation calculation using a grid (grating point) as shown in 1003.

A grid 1004 used in an interpolation calculation process 1003 has the position of the vertex of a cube in the CMY space whose CMY have the range of [0:1], and each grid has the following corresponding CMYK value:

|  | Grid value | | | Corresponding CMYK value | | | |
| --- | --- | --- | --- | --- | --- | --- | --- |
|  | C | M | Y | C | M | Y | K |
| White | 0 | 0 | 0 | 0.0 | 0.0 | 0.0 | 0.0 |
| Red | 0 | 1 | 1 | 0.0 | 0.9 | 0.9 | 0.0 |
| Yellow | 0 | 0 | 1 | 0.0 | 0.0 | 1.0 | 0.0 |
| Green | 1 | 0 | 1 | 0.9 | 0.0 | 0.9 | 0.0 |
| Cyan | 1 | 0 | 0 | 1.0 | 0.0 | 0.0 | 0.0 |
| Blue | 1 | 1 | 0 | 0.9 | 0.9 | 0.0 | 0.0 |
| Magenta | 0 | 1 | 0 | 0.0 | 1.0 | 0.0 | 0.0 |
| Black | 1 | 1 | 1 | 0.4 | 0.4 | 0.4 | 1.0 |

For an input CMY value 1005, the distance from each CMY grid value is computed, and a linear weighting operation is performed on a corresponding CMYK value using the weight depending on the distance, thereby outputting a CMYK value.

Normally, there are problems that the secondary colors (RGB) cannot be output by the amount of the toner of two colors, or Bk cannot be output by the amount of the toner of four colors because an electronic photo printer depends on the transfer and the fixing of toner, and an ink jet printer depends on the permeability of ink. According to the present embodiment, it is assumed that an output printer only carries the amount of toner of 1.8 colors for a secondary color, and the amount of toner of 2.2 colors for black. The CMYK value corresponding to the CMY value of Red, Green, and Blue, that is, CMY=(0,1,1)(1,0,1)(1,1,0), is set as CMYK= (0,0.9,0.9,0), (0.9,0,0.9,0), (0.9,0.9,0,0). The CMYK value corresponding to black is set as CMYK=(0.4,0.4,0.4,1).

To be more practical, assuming that the amount of secondary color toner is col2, and the amount of black toner is col4, the CMYK value of R, G, B, Bk is set as follows:

Red=(0,*col2*/2,*col2*/2,0)

Green=(*col2*/2,0,*col2*/2,0)

Blue=(*col2*/2,*col2*/2,0,0)

Black=((*col4*−1)/3,(*col4*−1)/3,(*col4*−1)/3,1)

It is obvious that these values and definitions are not limited to the above mentioned values, and can be freely set depending on the device characteristic or the purpose of an output. For example, if Black=(0,0,0,1)

the pure black expressed by RGB=(0,0,0) can be printed in one color, that is, black, thereby realizing 100% UCR.

Thus, according to the present embodiment, based on the condition for restricting the amount of recording material (amount of secondary color, amount of black), an output device is instructed to generate a color patch using an output value of a solid (a cube shown as 103 in FIG. 10) on which the output device defines reproducible colors in the three-dimensional color space. Therefore, in the Lab→DeviceRGB conversion unit 104, an appropriate process can be performed depending on a set condition.

Figure 11:
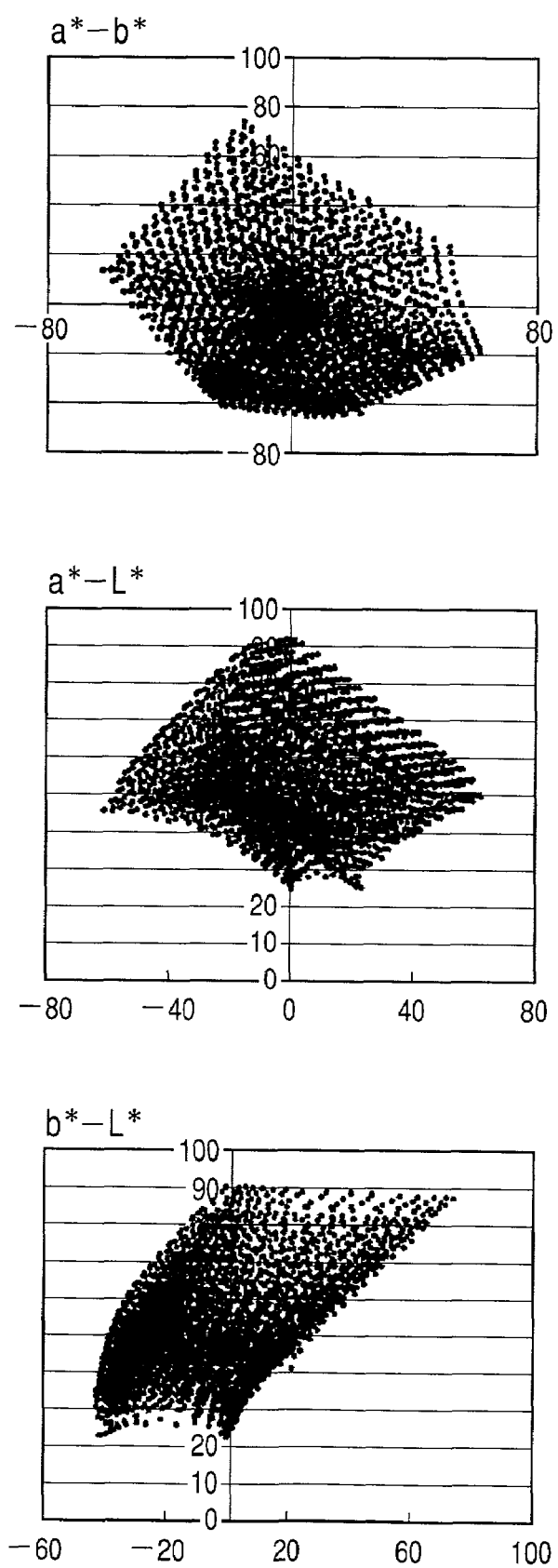
FIG. 11 shows a colorimetry value obtained by a colorimetry process performed by the color patch colorimetry unit 10 according to the fourth embodiment of the present invention.

FIG. 11 shows the distribution of the Lab colorimetry value obtained by performing the colorimetry process on a color patch output on a printer as in the first embodiment by using the DeviceRGB→CMYK conversion described in this embodiment. At this time, the parameters are:

γ=1.6 col2=1.8 col4=2.2

As compared with the distribution of the Lab colorimetry value of an output patch processed in the DeviceRGB→CMYK conversion according to the first embodiment shown in FIG. 4, the density of the distribution in the low range of L* is low while the density of the distribution in the high range of L* is high. Thus, using an output patch, the problems occurring in the first embodiment can be solved in many cases.

Furthermore, as in the first embodiment, when a Lab→DeviceRGB LUT is created from a DeviceRGB→Lab LUT, the number of samples can be changed depending on the L value. Therefore, a gradation jump in a DeviceRGB space, a bad white balance in a low brightness range due to the high density of samples in a low brightness range can be removed.

In addition, to more effectively set the density of the distribution of the colorimetry value of color patches independent of the brightness, the γ value can be appropriately changed depending on the gradation characteristic of an output printer. In addition to the gamma conversion described in the present embodiment, other computation methods using a polynomial function, etc., can be adopted.

Embodiment 5

Figure 12:
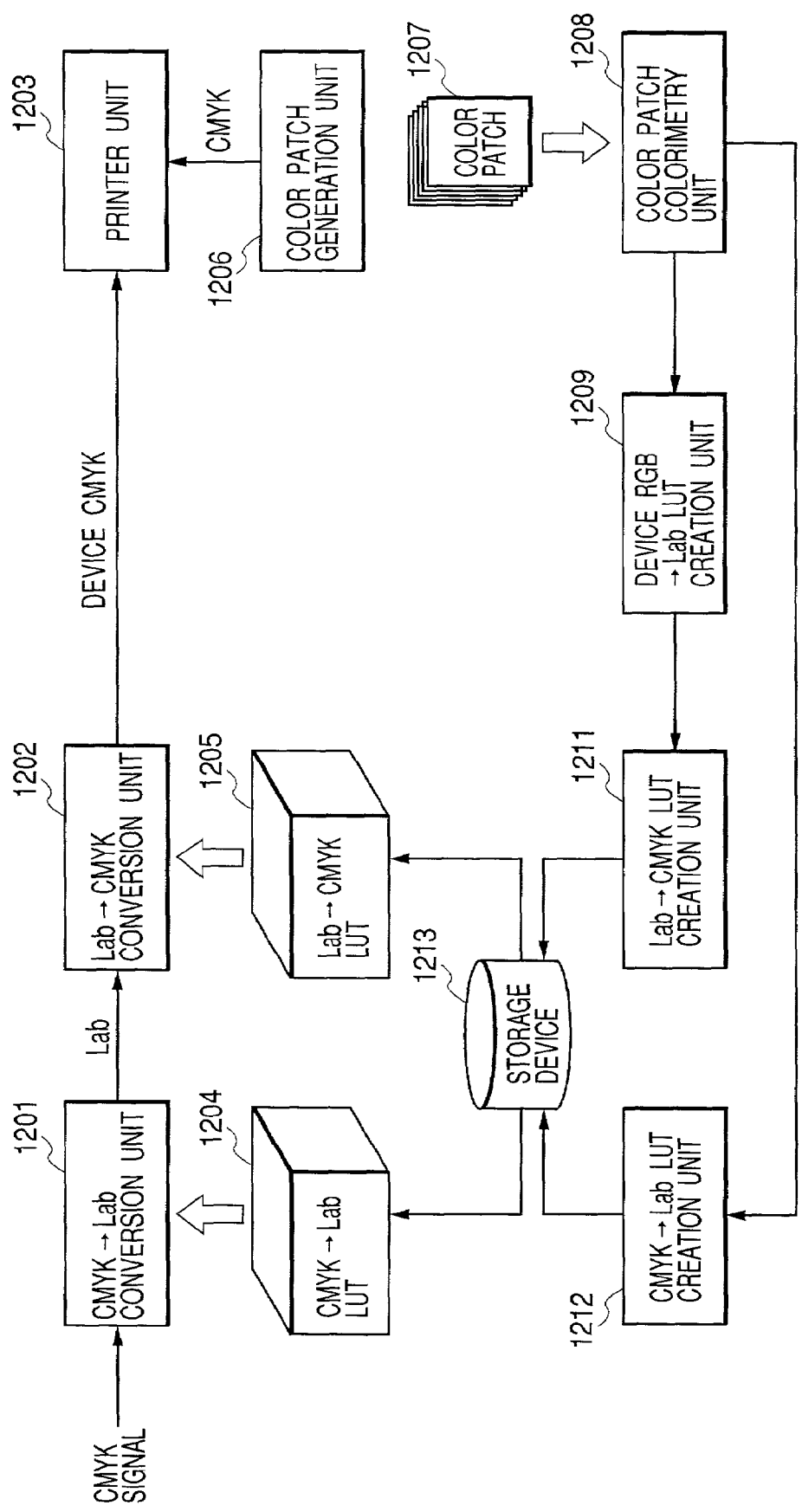
FIG. 12 shows the configuration of the fifth embodiment of the present invention.

FIG. 12 shows the process procedure according to the fifth embodiment of the present invention. According to the present embodiment, as in the second embodiment, a device independent color space can be converted into a printer color space, and an input color can be converted into a device independent color space in a LUT conversion process. Furthermore, according to the present embodiment, an LUT used in the above mentioned LUT conversion process is created.

A CMYK→Lab conversion unit 1201 and a Lab→CMYK conversion unit 1202 perform processes using a CMYK→Lab LUT 1204 and a Lab→CMYK LUT 1205, and output the processed data on a printer unit. This system is commonly used to simulate a proof, that is, an output image of a printing machine through color matching on a printer.

The CMYK signal input into the CMYK→Lab conversion unit 1201 is a CMYK signal depending on the characteristic of a printing machine. The input CMYK signal is converted into a device independent color space (a Lab space according to the present embodiment) by the CMYK→Lab conversion using the CMYK→Lab LUT 1204 holding the correspondence between the CMYK space dependent on a printing device and the device independent color space (the Lab color space according to the present embodiment).

The converted Lab signal is converted into a CMYK color space by the Lab→CMYK conversion unit 1202 using the Lab→CMYK LUT 1205 holding the correspondence between the CMYK space dependent on a printer and the Lab color space, and then output from the printer.

At this time, the LUT is read in both CMYK→Lab conversion and Lab→CMYK conversion, and is addressed using an input signal, thereby performing the interpolation calculation by addressing LUT.

The above mentioned color matching method is used in the color matching using the CRD in PostScript, or the color matching using an ICC profile. Especially, the ICC profile has the CMYK→Lab LUT and the Lab→CMYK LUT to realize the bi-directional conversion between a device-dependent space and a device-independent space.

The Lab→CMYK LUT and the CMYK→Lab LUT are created by a Lab→CMYK LUT creation unit 1211 and a CMYK Lab LUT creation unit 1212 by outputting a CMYK color patch from a printer unit 1203 through a color patch generation unit 1206, and based on the colorimetry value obtained by performing the colorimetry process on an obtained color patch 1207 by a color patch colorimetry unit 1208.

The Lab→CMYK LUT creation unit 1211 creates an LUT using the Lab→CMYK conversion method according to the first embodiment. However, since the Lab→CMYK conversion method according to the first embodiment creates an LUT based on the colorimetry value, the colorimetry value of the CMYK color patch according to the present embodiment cannot be used as is.

Since K can be reproduced by mixing CMY, the same colorimetry values can be obtained for a plurality of different CMYK values. Therefore, considering the element (for example, the luster, etc.) other than the colorimetry value affecting the appearance of color, it is desired that the amount of K is to be regularly changed. Accordingly, in the present embodiment, a Lab is converted into a CMYK value through an RGB color space. To attain this, a DeviceRGB→Lab LUT is created to generate a pseudo colorimetry value table of RGB color patches. In this process, a Lab can be converted into a device-dependent signal without considering K, thereby easily performing the process.

The CMYK→Lab LUT creation unit 1212 creates a CMYK→Lab LUT by performing the interpolation calculation using a colorimetry value table of CMYK color patches. The created LUT is stored in a storage device 1213, and is set as the Lab→CMYK LUT 1205 to be used by the Lab→CMYK conversion unit 1202, or set as a CMYK→Lab LUT to be used by the CMYK→Lab conversion unit in another proof system.

Each module is described below in detail.

Figure 13:
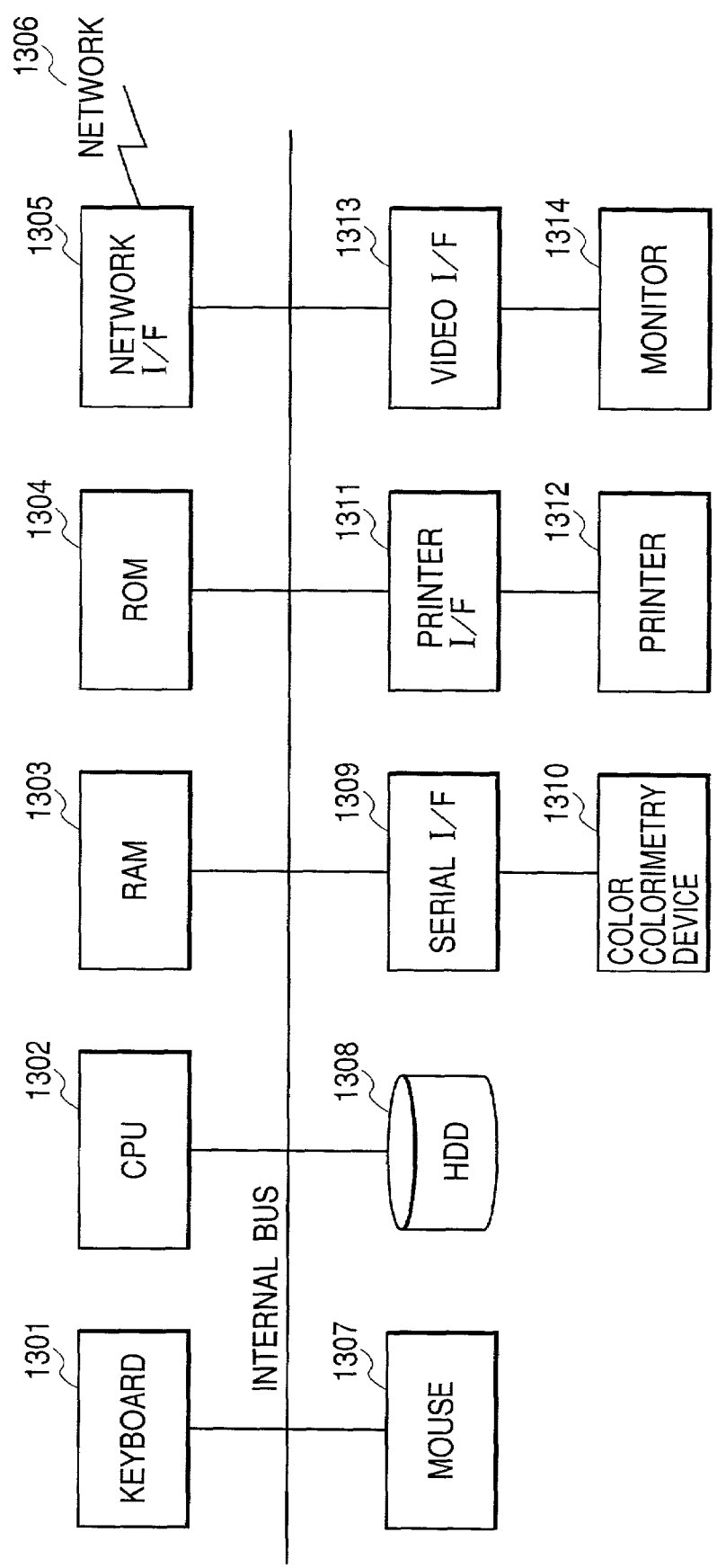
FIG. 13 shows an example of the practical configuration of the system.

FIG. 13 shows a practical example of the present embodiment.

FIG. 13 shows the type of a common computer system. Each of the process modules 1201, 1202, 1206, 1209, 1211, and 1212 shown in FIG. 12 is realized as a program stored in RAM 1303 or ROM 1304, read to a CPU 1302, and executed. The CMYK→Lab LUTs 1204 and 1205 are realized as areas reserved in the RAM 1303. A printer 1312 is controlled by a printer driver operated by the CPU 1302 through a printer I/F 1311, and functions as the printer unit 1203. As the printer unit 1203, another printer in a network 1306 can be used through a network I/F 1305. The color patch colorimetry unit 1208 is realized as a color colorimetry device 1310 controlled through a serial I/F 1309. As a storage device 1213, an HDD 1308 is used. A monitor 1314 is controlled through a video I/F 1313, and is used to display a GUI for controlling each module and color patch, etc. A keyboard 1301 and a mouse 1307 are used for input into the GUI.

Figure 14:
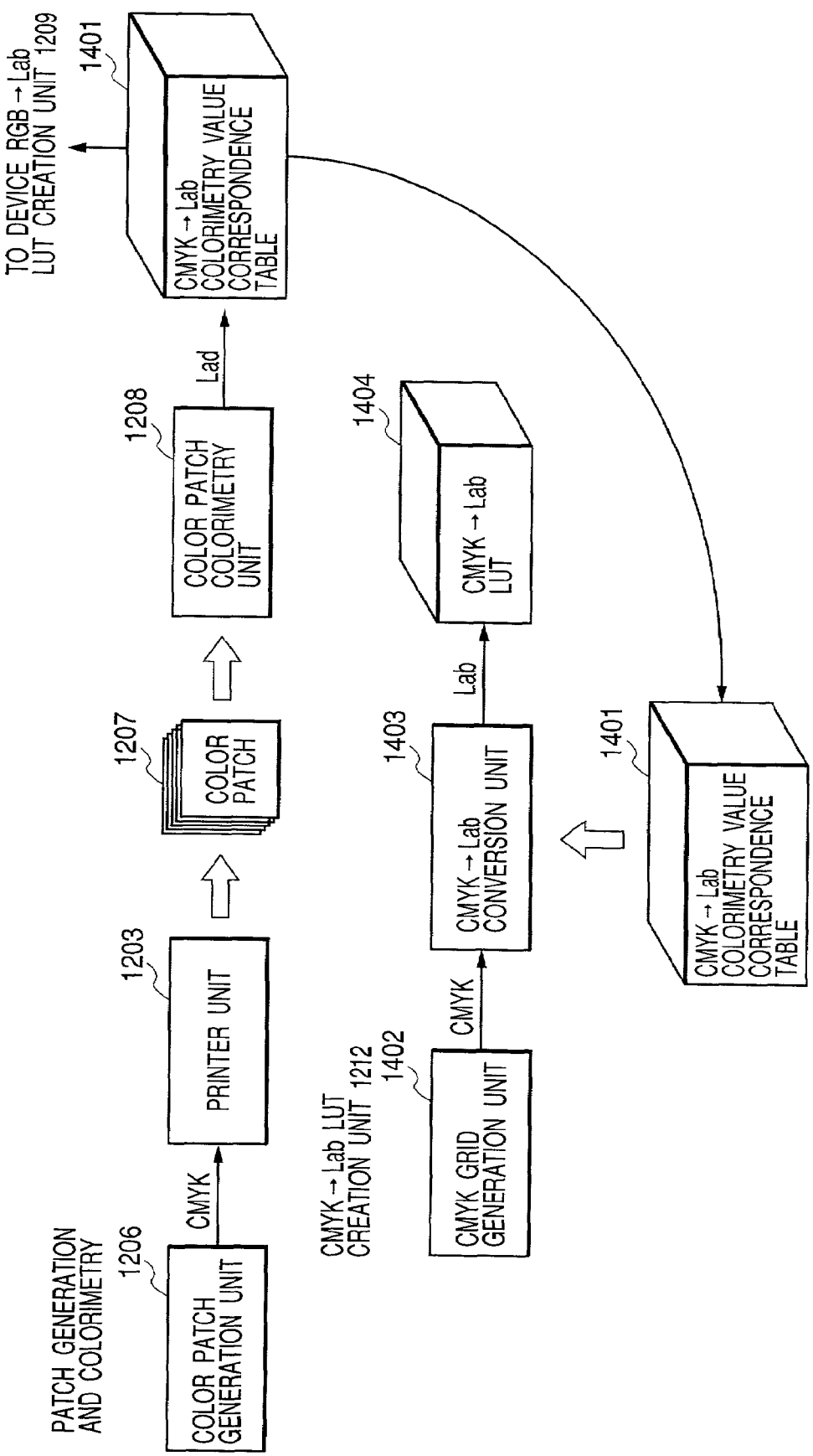
FIG. 14 shows the process according to the fifth embodiment of the present invention.
Figure 15:
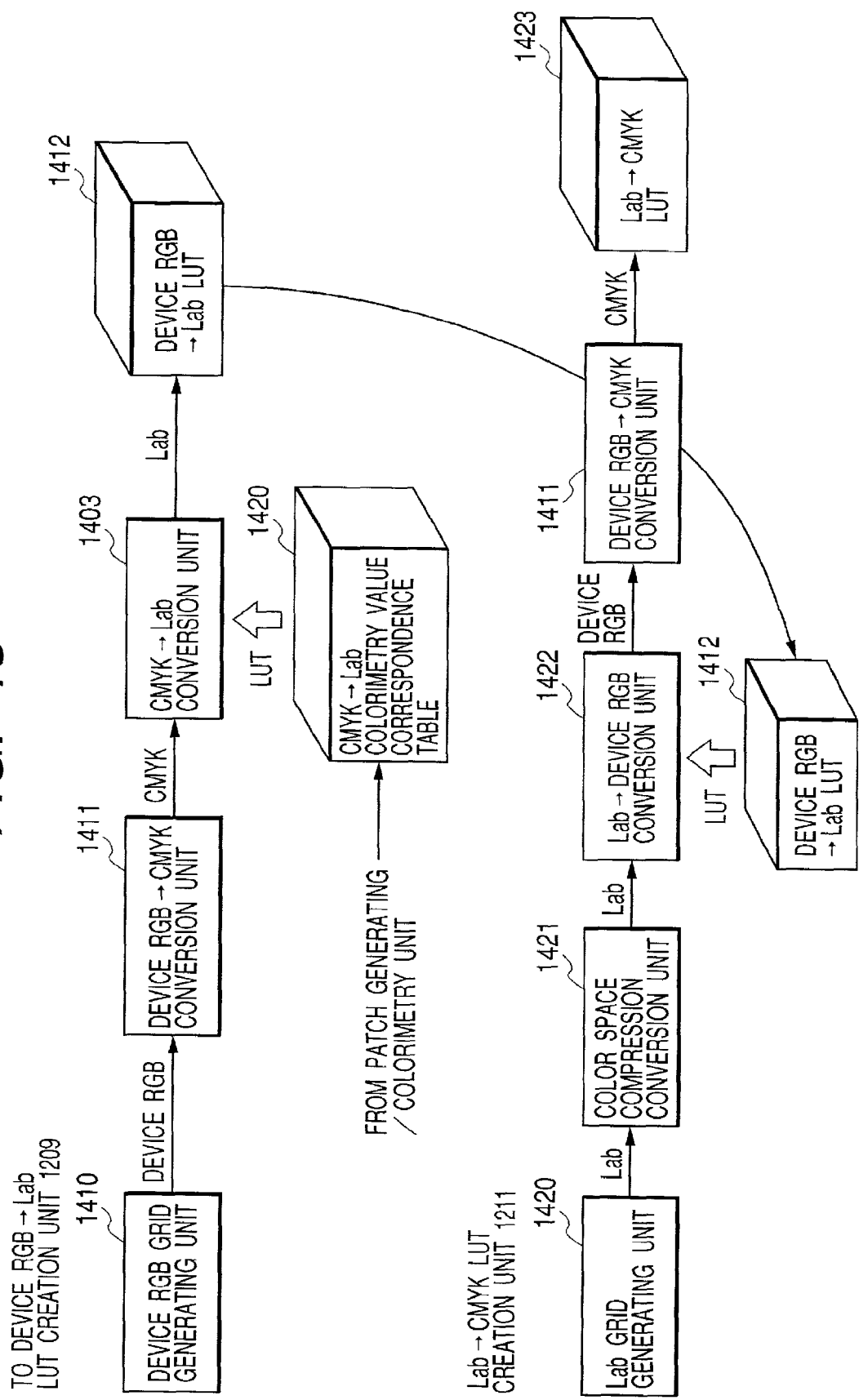
FIG. 15 shows the process according to the fifth embodiment of the present invention.

FIGS. 14 and 15 show in detail each module shown in FIG. 12.

A CMYK→Lab colorimetry value correspondence table 1401 can be obtained by the color patch colorimetry unit 1208 performing the colorimetry process on the color patch 1207 obtained by outputting a CMYK value generated by the color patch generation unit 1206 into the printer unit 1203. The color patch generation unit generates, for example, a color patch image having the following CMYK value:

| C | M | Y | K |
|---|---|---|---|
| 0 | 0 | 0 | 0 |
| 32 | 0 | 0 | 0 |
| 64 | 0 | 0 | 0 |
| ... | ... | ... | ... |
| 224 | 255 | 255 | 255 |
| 255 | 255 | 255 | 255 |

In this example, each of the C, M, and Y is assigned in 32 units, and K is assigned in 51 units, and color patches having 9×9×9×5 colorimetry values are generated. Of course, the CMYK value is not limited to these values.

The combinations (9×9×9×5) of these CMYK value and colorimetry value of a patch corresponding to the CMYK value form the CMYK→Lab colorimetry value correspondence table 1401.

Described below in detail is the CMYK→Lab LUT creation unit 1212. The CMYK→Lab LUT creation unit comprises a CMYK grid generation unit 1402 and a CMYK→Lab conversion unit 1403, and creates a CMYK→Lab LUT 1404.

The CMYK grid generation unit 1402 generates a combination of CMYK values as generated by the color patch generation unit 1206 using the number of grids specified by the user. For example, 9×9×9×9 CMYK values are generated with each of C, M, Y, and K assigned in 32 units. The generated CMYK values are input into the CMYK→Lab conversion unit 1403, and are converted into Lab values in the interpolation calculation using the CMYK→Lab colorimetry value correspondence table 1401 obtained by generating a patch and performing a colorimetry process. The converted Lab values are stored in the CMYK→Lab LUT 1404 with the information about the CMYK values generated by the CMYK grid generation unit 1402.

The Lab→CMYK LUT creation unit 1211 comprises a Lab grid generation unit 1420, a color space compression conversion unit 1421, a Lab→DeviceRGB conversion unit 1422, a DeviceRGB→Lab LUT 1412, and a DeviceRGB→CMYK conversion unit 1411, and creates a Lab→CMYK LUT 1423 with the method schematically described in the second embodiment. The Lab grid generation unit 1420 generates a Lab grid value using the number of grids specified by the user. For example, when a Lab value is processed as an 8-bit signal, and the user specifies 17×17×17 as the number grids, L ranges from 0 to 255, and a and b range from −128 to 127 in 16 units, thereby generating 4913 (=17×17×17) Lab grid values. Thus, the generated Lab values are converted into CMYK values by the color space compression conversion unit 1421, the Lab→DeviceRGB conversion unit 1422 for performing the process described in the first embodiment of the present invention, and the DeviceRGB→CMYK conversion unit 1411 for performing the process (shown in FIG. 10) described in the fourth embodiment of the present invention. The converted CMYK values are stored in the Lab→CMYK LUT 1423 with the information about the Lab grid generated by the Lab grid generation unit 1420.

To obtain the DeviceRGB→Lab LUT 1412 required by the Lab→DeviceRGB conversion unit 1422, the process of a DeviceRGB→Lab LUT creation unit 1209 has to be completed in advance.

The DeviceRGB→Lab conversion unit 1209 performs the following process on the RGB value corresponding to the grid in the DeviceRGB→Lab LUT created by a DeviceRGB grid generation unit 1410.

First, a RGB value is converted into a CMYK value based on the set amount of secondary color, the set amount of black, and the gamma value using the DeviceRGB→CMYK conversion unit 1411 which is a module used in the Lab→CMYK LUT creation unit 1211.

A Lab value corresponding to a CMYK value is obtained by the CMYK→Lab conversion unit 1403 which is a module used in the CMYK→Lab LUT creation unit 1212 using the CMYK→Lab colorimetry value correspondence table 1401.

For example, assuming that there are the following RGB grid values generated by the DeviceRGB grid generation unit 1410, the Lab values corresponding to the grid values can be computed:

| R | G | B |
|---|---|---|
| 0 | 0 | 0 |
| 0 | 0 | 32 |
| 0 | 0 | 64 |
| ... | ... | ... |
| 255 | 255 | 224 |
| 255 | 255 | 255 |

That is, the DeviceRGB→Lab LUT 1412 obtained by generating RGB color patches and performing the colorimetry process can be obtained.

According to the present embodiment, since the DeviceRGB→Lab LUT creation unit 1209 uses the DeviceRGB→CMYK conversion unit 1411, a DeviceRGB→Lab LUT depending on the set amount of secondary color, the set amount of black, and the gamma value can be created. That is, a conversion can be performed into a Device RGB value appropriately reproduced based on the set amount of secondary color and black by the Lab→deviceRGB conversion unit. Then, since the DeviceRGB→CMYK conversion unit similarly performs a process depending on the set amount of secondary color, the set amount of black, and the gamma value, it can be appropriately created depending on the condition of setting K.

That is, according to the present embodiment, a Lab→CMYK LUT can be created based on the set condition such that K can be regularly used.

According to the present embodiment, a color patch is generated regardless of the set condition. Then, the DeviceRGB→Lab LUT creation unit 1209 selects a colorimetry value satisfying the set condition from the CMYK→Lab colorimetry value correspondence table 1401 for use in the subsequent processes.

Thus, it is not necessary to generate a color patch and perform the colorimetry process each time the user sets again the set condition. That is, the previous colorimetry result can be used.

It is also possible to generate the color space compression conversion unit 1421 depending on the process of the DeviceRGB→Lab LUT creation unit. The color reproduction range of an output device changes depending on the set amount of secondary color and the set amount of black. Therefore, the color reproduction range satisfying the set condition is obtained, and the conversion condition of the color space compression conversion unit can be optimized, thereby realizing further improved color reproduction.

The boundary of the color reproduction range satisfying the set condition refers to, for example, a Lab colorimetry value corresponding to the six planes of the hexahedron in the 1003 shown in FIG. 10. Therefore, the Lab colorimetry values of RGBCMYWBk corresponding to the eight vertices of the hexahedron are obtained, and the hexahedron is estimated in the Lab color space from these eight vertexes, thereby estimating a color reproduction range. Then, by realizing the color space compression method explained in the first embodiment of the present invention using the estimated color reproduction range, the conversion condition of the color space compression conversion unit 1421 can be optimized.

FIG. 15 shows an example of a user interface for control of the above mentioned process. A GUI 1500 has a view 1501 for displaying a patch image to be output by the color patch generation unit 1206. The view is used to confirm whether or not the color patch generation unit 1206 have successfully generated a patch image. Furthermore, a LUT 1505 is obtained from a button 1502 for issuing an instruction to output a patch, perform the colorimetry process, create a CMYK→Lab LUT, and create a Lab→CMYK LUT, thereby instructing to start each of the above mentioned processes. When an LUT is created, the number of grids of a CMYK→Lab LUT can be set by setting the number of grids 1507 in a CMYK Lab LUT setting field 1506. For example, in a pull-down menu, the number of grids can be selected such as 9×9×9×9, 17×17×17×17, etc. In a Lab→CMYK LUT setting field 1508, the process of setting the number of grids 1509 similar to 1507 can be performed, and additionally the device characteristic of the output printer can be set. The field involved in individually setting a device characteristic 1510, the amount of secondary color toner, the amount of black toner, and the gradation correction gamma can be numerically set. The values are set to col2, col4, and γ as described in the fourth embodiment, and used by the DeviceRGB→CMYK conversion unit 1411 as a parameter for conversion. Furthermore, a device characteristic save button 1513 can save the settings, and the saved settings can be read by a device characteristic read button 1514 for reuse. When a recommended value of a device characteristic is to be obtained, the kind of device can be set in a device recommended value setting field 1511. In this case, the displayed device name, and the amount of the secondary toner, the amount of black toner, and the gradation correction gamma appropriate for the device are stored so that the amount of the secondary toner, the amount of black toner, and the gradation correction gamma can be automatically set when the device name is specified. The individual setting and the setting of a device recommended value are exclusively specified by a check button. The display can be designed for easier selection such that when one is specified, the other is grayed out.

Figure 16:
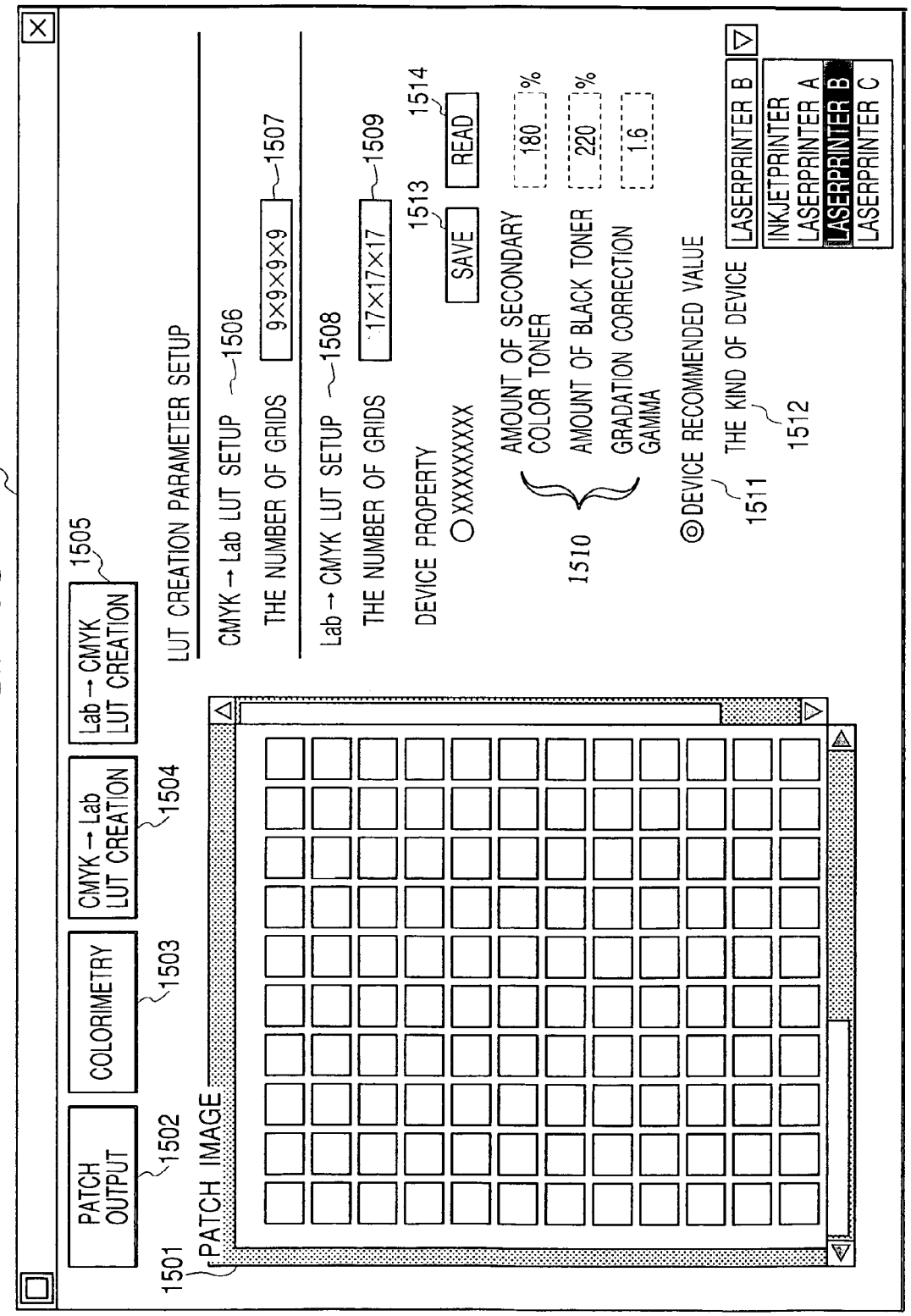
FIG. 16 shows an example of a GUI.
Figure 17:
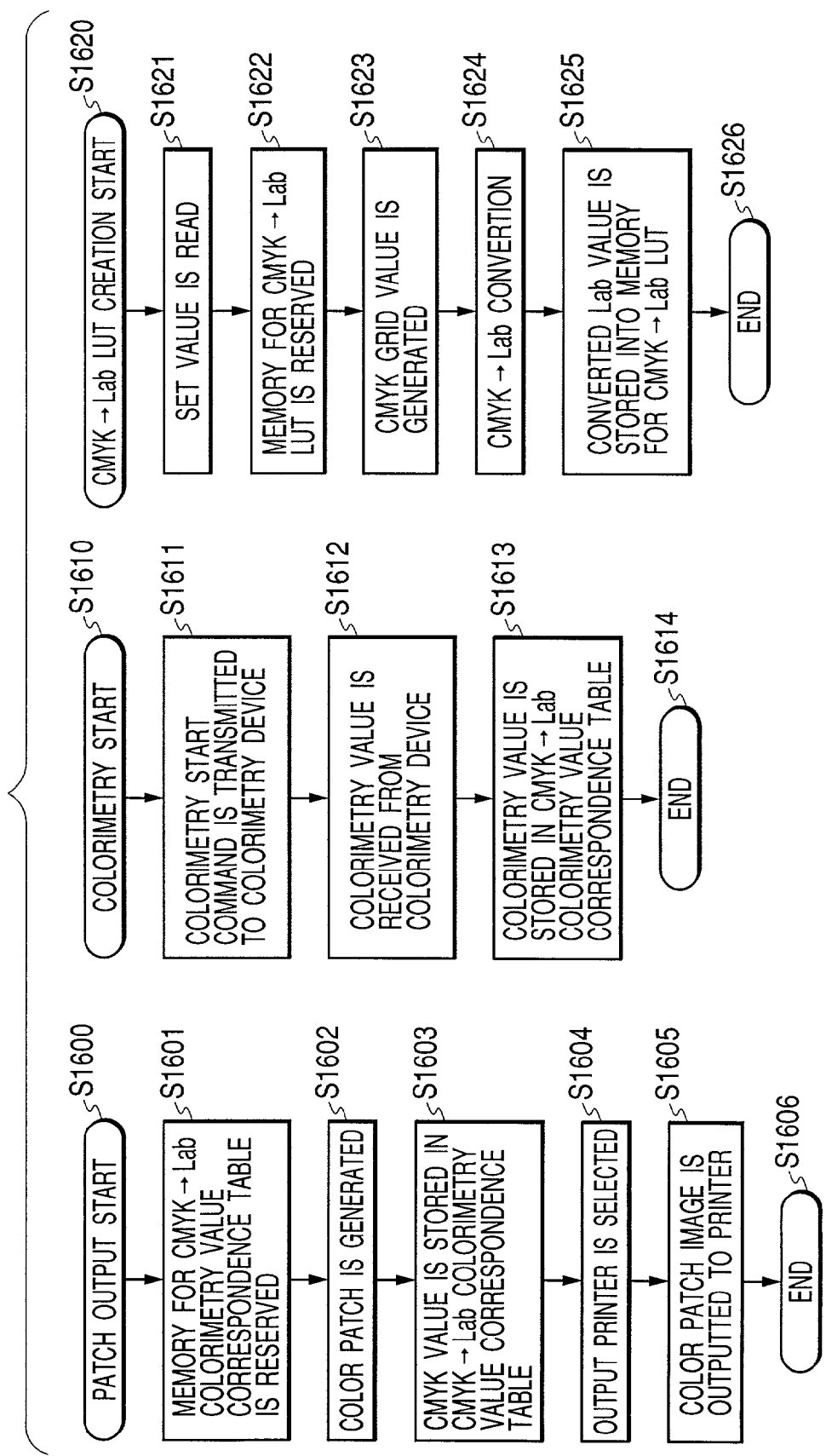
FIG. 17 shows an example 1 of the flow of the process.
Figure 18:
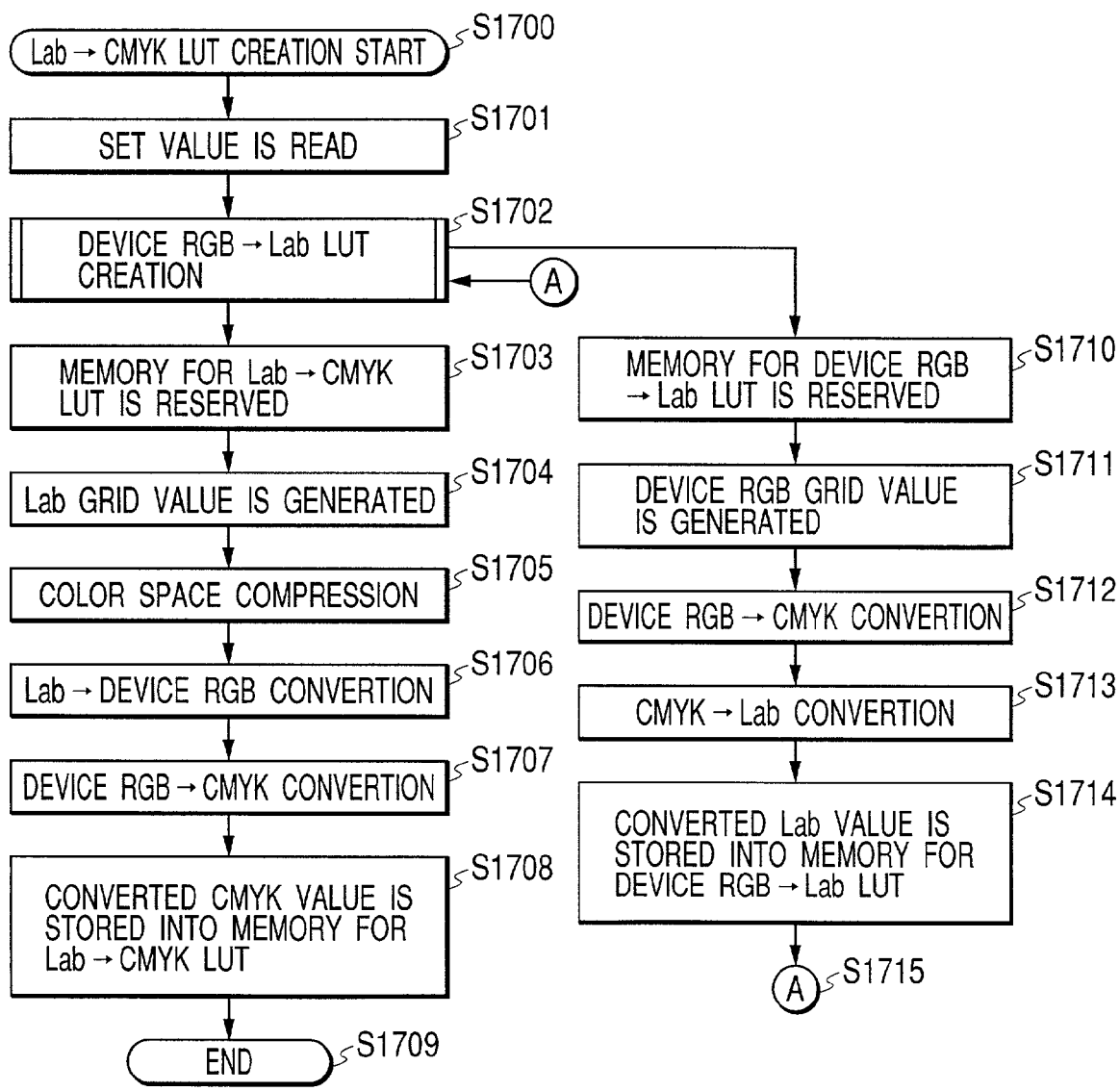
FIG. 18 shows an example 2 of the flow of the process.

FIGS. 16 and 17 show the flow of the process performed when each of the operations is selected from the GUI using the patch output button 1502, a colorimetry button 1503, a CMYK→Lab LUT creation button 1504, and a Lab→CMYK LUT creation button 1505.

When the patch output button 1502 is pressed, outputting a patch is started in S1600. Then, in S1601, an area of the CMYK→Lab colorimetry value correspondence table memory is reserved, and a color patch is generated in S1602. In S1603, the CMYK value is stored in the CMYK→Lab colorimetry value correspondence table. In S1604, an output printer is selected. In S1605, a color patch image is output on the printer, thereby terminating the process.

When a color patch output on the printer is obtained, the colorimetry process is started. The output color patch is set in the colorimetry device, the colorimetry button 1503 is pressed, and control is passed to S1610. In S1611, a command to start the colorimetry process is transmitted to the colorimetry device through a serial IF, and a colorimetry value is received from the colorimetry device in S1612. In S1613, the colorimetry value is stored in the CMYK→Lab colorimetry value correspondence table, thereby completing the CMYK→Lab colorimetry value correspondence table 1401 and terminating the process.

Then, each LUT is created.

When the CMYK→Lab LUT creation button 1504 is pressed, the process of creating an LUT is started in S1620. In S1621, the number of grids specified by 1507 is first checked. In S1622, a memory area corresponding to the specified number of grids is reserved as CMYK→Lab LUT memory. In S1623, a CMYK grid value corresponding to the number of grids is generated. In S1624, the grid value is converted into a Lab value. In S1625, the Lab value is stored in the CMYK→Lab LUT memory, thereby terminating the process.

When the Lab→CMYK LUT creation button 1505 is pressed, the process of creating an LUT is started in S1700. In S1701, the set value, the number of grids, the amount of secondary color toner, the amount of black toner, and the gradation correction gamma value are obtained in the GUI and stored. Then, in S1702, the process of creating a DeviceRGB→Lab LUT is started. In S1710, a memory area for storing a DeviceRGB→Lab LUT is reserved. In S1711, a Device RGB grid value is generated, stored in the DeviceRGB→Lab LUT, converted into a Lab value through the DeviceRGB→CMYK conversion in S1712 and the CMYK Lab conversion in S1713, and stored in the DeviceRGB→Lab LUT memory in S1714, thereby terminating the process.

Upon obtaining the DeviceRGB→Lab LUT, memory for the Lab→CMYK LUT is reserved corresponding to the number of grids specified by 1509 in S1703. In S1704, a Lab grid value is generated based on the specified number of grids. The generated Lab grid value is converted into a CMYK value through the color space compression process in S1705, the Lab→DeviceRGB conversion process in S1706, and the DeviceRGB→CMYK conversion process in S1707, and stored in the Lab→CMYK LUT in S1708, thereby terminating the process.

(Modifications)

In the above mentioned embodiments, a Lab is used as a color space independent of a device, but other spaces such as XYZ, Luv, etc., can also be used. Furthermore, a printer is used as an output device, but other output devices such as a printing device, etc., can also be used. Similarly, a color signal to be transferred to a printer unit is not limited to the YMCK, but other color signals can be used.

In the above mentioned embodiments, the number of patches is 729, but other numbers can also be used.

While the number N of the table values for use in the interpolation calculation is set based on the brightness L as shown in FIG. 4, it may be set three-dimensionally in consideration of a and b in addition to the brightness L.

Additionally, the present invention also includes the above mentioned devices operated by a program stored in the computer (CPU or MPU) of a system or a device connected to the devices to realize the function of the above mentioned embodiments and to operate the devices by providing a program code of the software for realizing the function of the above-mentioned embodiments.

In this case, the functions of the above-mentioned embodiments are realized by the program code of the software. The program code and a unit for providing the program code for the computer, for example, a storage medium storing the program code configure the present invention.

As a storage medium storing the program code can be a floppy disk, a hard disk, an optical disk, a magneto-optical disk, CD-ROM, a magnetic tape, a non-volatile memory card, ROM, etc.

Furthermore, the present invention obviously includes the program code not only in the realization of the functions of the above mentioned embodiment by executing the program code provided for the computer, but also in the realization of the functions of the above mentioned embodiments in cooperation with the OS (operating system) operated in the computer, or other application software, etc.

Additionally, the present invention obviously includes the program code in the realization of the functions of the above mentioned embodiments when the program code is stored in the memory of a computer function extension board or a function extension unit connected to the computer, and the CPU, etc., in the function extension board or the function extension unit performs a part or all of the actual process according to an instruction of the program code.

What is claimed is:

1. An image processing method for generating a conversion condition for converting input color data in a device independent color space into output color data in a device dependent color space, comprising the steps of:
    inputting measurement data, indicated in the device independent color space, of a color patch output by an output device;
    converting the input color data indicated in the device independent color space into color data indicated by a first plurality of color components, the first plurality of color components consisting of three color components none of which is a black component, on the basis of the measurement data;
    setting a condition for restricting an amount of recording material;
    computing color data indicated by a second plurality of color components at each vertex of a solid defining a color reproducible by the output device on a three-dimensional color space, based on the set condition, wherein the second plurality of color components includes plural color components, one of which is a black component; and
    interpolating the output color data, indicated by the second plurality of color components, corresponding to the converted input color data, from the computed color data at at least one of the vertices.

2. The method according to claim 1, wherein
    recording materials of the output device include cyan, magenta, yellow and black materials,
    the condition for restricting the amount of the recording material includes a condition for restricting an amount of secondary color (red, green, and blue) and a condition for restricting an amount of black,
    the vertices of the solid are red, green, blue, cyan, magenta, yellow, black, and white vertices, and
    the color data at the red, green, and blue vertices are computed based on the condition for restricting the amount of secondary color, and the color data at the black vertex is computed based on the condition for restricting the amount of black.

3. The method according to claim 1, further comprising a step of setting a gamma value.

4. The method according to claim 1, wherein the condition for restricting the amount of recording material is set according to a user instruction.

5. The method according to claim 4, wherein the user instruction is to designate a kind of the output device.

6. The method according to claim 1, wherein the input color data outside a color gamut of the output device is mapped into the color gamut.

7. An image processing method, comprising the steps of:
    generating a color patch by an output device according to first color data indicated by a plurality of color components containing a black component;
    inputting measurement data of the color patch, indicated in a device independent color space;
    generating a relation between the first color data and the measurement data;
    generating a first conversion condition for converting second color data indicated by three color components not containing a black component into third color data in the device independent color space, based on a second conversion condition for converting the second color data into the first color data and the relation; and
    obtaining a third conversion condition for converting the third color data in the device independent color space into the first color data based on the first conversion condition and the second conversion condition.

8. The method according to claim 7,
    wherein the second condition is a condition for restricting an amount of recording material.

9. An image processing apparatus for generating a conversion condition for converting input color data in a device independent color space into output color data in a device dependent color space, comprising:
    an inputting unit for inputting measurement data, indicated in the device independent color space, of a color patch output by an output device;
    a converting unit for converting the input color data indicated in the device independent color space into color data indicated by a first plurality of color components, the first plurality of color components consisting of three color components none of which is a black component, on the basis of the measurement data;
    a setting unit for setting a condition for restricting an amount of recording material;
    a computing unit for computing color data indicated by a second plurality of color components at each vertex of a solid defining a color reproducible by the output device on a three-dimensional color space, based on the set condition, wherein the second plurality of color components includes plural color components, one of which is a black component; and
    an interpolation unit for interpolating the output color data, indicated by the second plurality of color components, corresponding to the converted input color data, from the computed color data at least one of the vertices.

10. An image processing apparatus, comprising:
    a processor for generating a color patch by an output device according to first color data indicated by a plurality of color components containing a black component;
    an input unit for inputting measurement data of the color patch, indicated in a device independent color space;
    a processor for generating a relation between the first color data and the measurement data;
    a processor for generating a first conversion condition for converting second color data indicated by three color components not containing a black component into third color data in the device independent color space, based on a second conversion condition for converting the second color data into the first color data and the relation; and
    a processor for obtaining a third conversion condition for converting the third color data in the device independent color space into the first color data based on the first conversion condition and the second conversion condition.

11. A computer-readable storage medium storing a program for implementing an image processing method for generating a conversion condition for converting input color data in a device independent color space into output color data in a device dependent color space, the program comprising the processes of:

inputting measurement data, indicated in the device independent color space, of a color patch output by an output device;

converting the input color data indicated in the device independent color space into color data indicated by a first plurality of color components, the first plurality of color components consisting of three color components none of which is a black component, on the basis of the measurement data;

setting a condition for restricting an amount of recording material;

computing color data indicated by a second plurality of color components at each vertex of a solid defining a color reproducible by the output device on a three-dimensional color space, based on the set condition, wherein the second plurality of color components includes plural color components, one of which is a black component; and interpolating the output color data, indicated by the second plurality of color components, corresponding to the converted input color data, from the computed color data at at least one of the vertices.

12. A computer-readable storage medium storing a program, the program comprising the processes of:

generating a color patch by an output device according to first color data indicated by a plurality of color components containing a black component;

inputting measurement data of the color patch, indicated in a device independent color space;

generating a relation between the first color data and the measurement data;

generating a first conversion condition for converting second color data indicated by three color components not containing a black component into third color data in the device independent color space, based on a second conversion condition for converting the second color data into the first color data and the relation; and obtaining a third conversion condition for converting the third color data in the device independent color space into the first color data based on the first conversion condition and the second conversion condition.

* * * * *

UNITED STATES PATENT AND TRADEMARK OFFICE
CERTIFICATE OF CORRECTION

PATENT NO.       : 7,239,425 B2                                    Page 1 of 1
APPLICATION NO.  : 09/946619
DATED            : July 3, 2007
INVENTOR(S)      : Takeshi Namikata It is certified that error appears in the above-identified patent and that said Letters Patent is hereby corrected as shown below:

COLUMN 1:

Line 65, "at least" should read --at at least--.

COLUMN 2:

Line 52, "unit 10" should read --unit 110--.

COLUMN 5:

Line 28, "L*area." should read --L* area.--.

COLUMN 13:

Line 9, "CMYK Lab LUT" should read --CMYK → Lab LUT--.

COLUMN 14:

Line 16, "CMYK Lab" should read --CMYK → Lab--; and
    Line 32, "Furthermore," should read --¶ Furthermore,--.

COLUMN 16:

Line 41, "at least" should read --at at least--.

Signed and Sealed this

Twenty-ninth Day of April, 2008

JON W. DUDAS
*Director of the United States Patent and Trademark Office*